C. T. MASON.
Electric Fan.
No. 78,674.
Patented June 9, 1868.
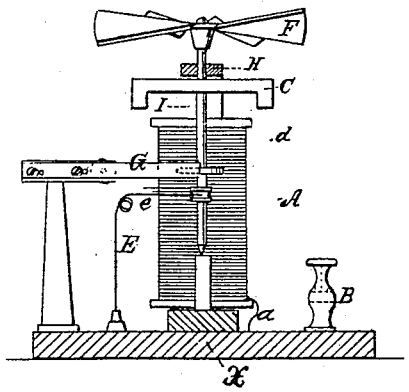
Witnesses.
Theo Tusche
J. A. Service.
Inventor.
Chas T Mason
Per Munn & Co.

UNITED STATES PATENT OFFICE.

C. T. MASON, OF SUMTER, SOUTH CAROLINA.

ELECTRIC FAN FOR LAMPS.

Specification forming part of Letters Patent No. 78,674, dated June 9, 1868.

*To all whom it may concern:*

Be it known that I, CHARLES T. MASON, of Sumter, Sumter county, South Carolina, have invented a new and Improved Electric Fan for Lamps; and I do hereby declare that the following is a full, clear, and exact description thereof, which will enable others skilled in the art to make and use the same, reference being had to the accompanying drawing, forming part of this specification.

This invention relates to an electric fan for lamps; and it consists in the application of a U-shaped electric coil to revolve a fan which may be similar to that described in the patent granted to F. B. Dekeravenan, on the 10th day of February, 1863, or of any other suitable kind, to increase the draft of air to a burner.

The accompanying drawing is a sectional view of my electric fan.

A is the coil of wire, wound round the spools carried on the arms of a U magnet of soft iron. The end $a$ of the coil wound on the spool on one arm is electrically connected with the standard B, in which the wire from one pole of the battery connects. The end of the coil wound on the spool on the other arm is carried beneath the stage $x$ and returned at E, where it makes connection by its bent arm $e$ with spindle D.

H is a bar of any suitable material not being a conductor of a magnetic current, its purpose being to furnish the upper bearing for the spindle D, which carries the fan F.

C is an armature of soft iron, set on the spindle D and revolving with it.

The spindle D carries a cam, $d$, which, as it revolves, breaks and makes connection by means of the spring G, of silver or other suitable material.

The electric fan being set in place, having free connection with the burners of a portable or fixed lamp, a current of electricity is conveyed from the battery to the coil, causing the fan to revolve and producing a draft of air to the burner.

Although I have shown but one form of instrument for producing the revolution of a fan by means of an electric current, the same object may be produced by numerous modifications of the instrument employed, which will readily occur to the electrician.

Having thus described my invention, what I claim as new, and desire to secure by Letters Patent, is—

1. The application of electricity to cause the revolution of a fan for the production of a draft of air, substantially as and for the purpose described.

2. The combination of the electric coil A and fan F and their respective equivalents in manner substantially as and for the purposes described.

C. T. MASON.

Witnesses:
   WM. F. MCNAMARA,
   M. R. LEVERSON.